(12) United States Patent
Hagelqvist

(10) Patent No.: US 12,459,690 B2
(45) Date of Patent: Nov. 4, 2025

(54) EXPANSIBLE PRESS PLUNGER, AN ATTACHMENT UNIT FOR ATTACHING A CONTAINER ELEMENT TO A CONTAINER BODY AND A METHOD FOR SEALING A PACKAGING CONTAINER

(71) Applicant: GPI Systems AB, Lund (SE)

(72) Inventor: Per Hagelqvist, Lund (SE)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 18/032,391

(22) PCT Filed: Oct. 13, 2021

(86) PCT No.: PCT/SE2021/050999
§ 371 (c)(1),
(2) Date: Apr. 18, 2023

(87) PCT Pub. No.: WO2022/086391
PCT Pub. Date: Apr. 28, 2022

(65) Prior Publication Data
US 2023/0382584 A1  Nov. 30, 2023

(30) Foreign Application Priority Data

Oct. 20, 2020  (SE) .................................. 2051219-0

(51) Int. Cl.
*B65B 51/14* (2006.01)
*B29C 65/00* (2006.01)
(Continued)

(52) U.S. Cl.
CPC .......... *B65B 51/144* (2013.01); *B29C 66/542* (2013.01); *B29C 66/81423* (2013.01);
(Continued)

(58) Field of Classification Search
CPC ................ B65B 51/144; B65B 7/2878; B29C 66/81457; B29C 66/542; B29C 66/8322; B29C 66/82261; B29L 2031/7166
See application file for complete search history.

(56) References Cited

U.S. PATENT DOCUMENTS 1,319,082 A * 10/1919 Hulbert ................... B31B 50/00
229/5.6
2,423,965 A * 7/1947 Coyle ................... B29C 66/612
493/84
(Continued)

FOREIGN PATENT DOCUMENTS

JP      S61 47309 A    3/1986
NO      170204 B       6/1992
(Continued)

OTHER PUBLICATIONS

International Search Report and Written Opinion for PCT/SE2021/05999 dated Oct. 27, 2021.
(Continued)

*Primary Examiner* — Andrew M Tecco
*Assistant Examiner* — Nicholas E Igbokwe
(74) *Attorney, Agent, or Firm* — FisherBroyles, LLP

(57) ABSTRACT

A radially expansible press plunger has a base plate, a first expansion tool and a second expansion tool. The first expansion tool and the second expansion tool are movable in relation to each other in the axial direction. The first expansion tool has at least one inclined plane surface. The second expansion tool has at least one inclined plane surface corresponding to the at least one inclined plane surface on the first expansion tool. Each inclined plane surface on the first expansion tool contacts and applies pressure to the corresponding inclined plane surface of the second expansion tool when the expansible press plunger is in the radially expanded state. An attachment unit for attaching a container (Continued)

sealing element to a container body and a method for attaching a container sealing element to a container body are also disclosed.

21 Claims, 8 Drawing Sheets

(51) Int. Cl.
  *B65B 7/28* (2006.01)
  *B29L 31/00* (2006.01)
(52) U.S. Cl.
  CPC .. *B29C 66/81427* (2013.01); *B29C 66/81453* (2013.01); *B29C 66/81457* (2013.01); *B29C 66/82261* (2013.01); *B29C 66/8322* (2013.01); *B29C 66/849* (2013.01); *B65B 7/2878* (2013.01); *B29L 2031/7166* (2013.01)

(56) References Cited

U.S. PATENT DOCUMENTS

| | | | |
|---|---|---|---|
| 4,640,733 A | 2/1987 | Bogren | |
| 4,724,654 A * | 2/1988 | Dahlin | B29C 66/8161 53/361 |
| 5,913,798 A * | 6/1999 | Grabher | B65B 7/2878 53/329.2 |
| 9,546,009 B2 | 1/2017 | Hagelqvist et al. | |
| 9,815,579 B2 | 11/2017 | Larsson et al. | |
| 9,821,527 B2 | 11/2017 | Hagelqvist | |
| 11,292,625 B2 | 4/2022 | Holka et al. | |
| 2006/0033255 A1* | 2/2006 | Yonezawa | B23Q 1/009 269/309 |
| 2014/0215973 A1* | 8/2014 | Hagelqvist | B65B 7/2878 53/299 |
| 2015/0000368 A1* | 1/2015 | Barthlein | B29C 57/04 72/393 |
| 2020/0180797 A1* | 6/2020 | Holka | B65B 7/2878 |

FOREIGN PATENT DOCUMENTS

| | | |
|---|---|---|
| WO | WO 96/31406 A1 | 10/1996 |
| WO | WO 2009/089266 A1 | 7/2009 |
| WO | WO 2013/009226 A1 | 1/2013 |

OTHER PUBLICATIONS

Supplementary European Search Report for EP 21 88 3402 dated Sep. 26, 2024.

* cited by examiner

EXPANSIBLE PRESS PLUNGER, AN ATTACHMENT UNIT FOR ATTACHING A CONTAINER ELEMENT TO A CONTAINER BODY AND A METHOD FOR SEALING A PACKAGING CONTAINER

CROSS-REFERENCE TO RELATED APPLICATIONS

The present application is a national stage entry under 35 U.S.C. § 371 of International Patent Application No. PCT/SE2021/050999, filed on Oct. 13, 2021, which claims the benefit of Swedish Patent Application No. 2051219-0, filed on Oct. 20, 2020.

INCORPORATION BY REFERENCE

The disclosures of each of International Patent Application No. PCT/SE2021/050999, filed on Oct. 13, 2021, and Swedish Patent Application No. 2051219-0, filed on Oct. 20, 2020, are hereby incorporated by reference for all purposes as if presented herein in their entirety.

TECHNICAL FIELD

The present disclosure relates to a radially expansible press plunger having a plunger axis extending in an axial direction perpendicular to a radial direction, the expansible press plunger being expansible in the radial direction. The press plunger comprises a base plate, a first expansion tool and a second expansion tool. The first expansion tool and the second expansion tool are movable in relation to each other in the axial direction. The base plate has a bottom surface and an upper surface opposite the bottom surface with the upper surface facing the first expansion tool in the axial direction. The second expansion tool has a top end and a bottom end and comprises an expansion tool side wall extending from the top end to the bottom end and having an inner surface and an outer surface. The expansion tool side wall comprises a circumferential edge portion at the bottom end of the second expansion tool, the circumferential edge portion of the second expansion tool being arranged outward of the first expansion tool in the radial direction. The second expansion tool is transformable between an unexpanded state and a radially expanded state under influence from the first expansion tool.

The disclosure also relates to an attachment unit for attaching a container sealing element in a container body and a method for sealing a packaging container using the attachment unit.

BACKGROUND

When packaging consumer goods, and in particular when packaging dry flowable consumer goods, it is common to use rigid paperboard packaging containers which serve as protective transport and storage containers at the retail end and as storage and dispensing containers at the consumer end. Such paperboard containers are usually provided with an openable and closable lid.

European patent publication EP 247 986 B1 discloses an expandable type lid welding piston comprising two piston parts; a formation part and an expansion part which are axially movable in relation to each other. The expansion part is operable to provide peripheral expansion of a section of the piston when the two parts are moved together, the expansion part comprising an expansion disc made of a deformable material and the formation part comprising a bottom plate having an upper surface supporting and guiding at least a part of the bottom surface of the expansion disc. The outer peripheral surface of the bottom plate is of the same shape as the outer peripheral edge of the expansion disc. The expansion disc is normally cup-shaped, and the bottom plate has at least the same size as the outer peripheral edge of the expansion disc in its normal, unexpanded condition. The formation and expansion parts are so arranged that axial movement of these parts towards one another results in flattening of the expansion disc from its cup-shape such that the outer peripheral edge thereof moves to extend beyond the periphery of the bottom plate. The lid welding piston may be used as a part in an apparatus for producing packaging containers and serves to introduce and position an inner flexible lid in a container tube and to press an edge portion of the flexible lid against an inner wall of the container tube during a welding operation for attaching the inner flexible lid to the container wall. The lid welding piston is introduced into the container tube with the expansion disc in the unexpanded or normal state. When the flexible lid has been placed at the intended position inside the container tube, the piston parts are moved together, whereby the expansion disc is transformed to the expanded state with the peripheral edge of the expansion disc extending beyond the periphery of the bottom plate, thereby causing the expansion disc to press the edge portion of the flexible lid against the inner wall of the container tube.

US patent publication U.S. Pat. No. 4,989,394 A discloses a device similar to the device in EP 247 986 B1. Hence, U.S. Pat. No. 4,989,394 A discloses a radially expansible press plunger comprising two main parts, i.e. a formation part and an expansion part which are movable in relation to each other. The expansion part is arranged to provide an expansion of at least some part of the press plunger when the main parts are moved together. The expansion part comprises a cup-formed expansion body and the formation part is designed with a formation surface against which at least parts of the expansion body is adapted to slide when the formation part and the expansion part are moved axially towards each other. The expansion part is composed of two different portions; an outer press portion for executing the actual radially outwards directed contact pressure of the press plunger and consisting of a wear resistant temperature resistant and elastic material; and an inner carrier portion of a relatively hard, elastic material, which carrier portion carries the press portion.

Document WO 2013/009226 A1 discloses an apparatus and a method for sealing a card-board based container. The apparatus comprises: a welding unit configured to fasten a lid to the container, which welding unit comprises an inductive welding energy generator for melting of a weldable layer that forms part of the container and/or the lid; and transporting means configured to transport a flow of containers to and from the welding unit. The transporting means comprises, in a container flow order, a feeding arrangement, a main conveyor member and a movable gripping arrangement the feeding arrangement being configured to transfer containers one by one in a continuous manner to the main conveyor member and the gripping arrangement being configured to transfer containers from the main conveyor member to the welding unit. Document WO 2013/009226 A1 also discloses a method for operating an apparatus of this type.

Although these previously known arrangements for applying a sealing member in a container have been found to be adequate for that purpose, there is still room for further improvement. An object of the present disclosure may therefore be to offer a versatile expansible press plunger having improved functionality. A further object of the present disclosure may be to offer a versatile attachment unit having improved functionality. Yet another object of the present disclosure may be to offer an improved method of attaching a sealing member when producing a paperboard container.

An overall object of the present disclosure is to overcome or ameliorate at least one of the disadvantages of the prior art, or to provide a useful alternative.

SUMMARY

One or more of the above objects may be achieved by the subject-matter of the independent claims. Embodiments are set forth in the appended dependent claims, in the following description and in the drawings.

Disclosed herein is an expansible press plunger, the expansible press plunger having a plunger axis extending in an axial direction perpendicular to a radial direction. The expansible press plunger is expansible in the radial direction and comprises a base plate, a first expansion tool and a second expansion tool. The first expansion tool and the second expansion tool are movable in relation to each other in the axial direction. The base plate has a bottom surface and an upper surface opposite the bottom surface, the upper surface faces the first expansion tool and the second expansion tool in the axial direction. The second expansion tool has a top end and a bottom end and comprises an expansion tool side wall having an inner surface and an outer surface. The expansion tool side wall extends from the top end to the bottom end of the second expansion tool. The expansion tool side wall comprises a circumferential edge portion at the bottom end of the second expansion tool, the circumferential edge portion of the second expansion tool being arranged outward of the first expansion tool in the radial direction. The circumferential edge portion at the bottom end of the second expansion tool may also be referred to as a terminal circumferential edge portion at the bottom end of the second expansion tool. The circumferential edge portion may for example be limited in its extension above the bottom end. For example, the circumferential edge portion may be limited to 10% or even 5% of the expansion tool side wall of the second expansion tool. The second expansion tool is transformable between an unexpanded state and a radially expanded state. The first expansion tool comprises one or more inclined plane surface(s), each inclined plane surface of the first expansion tool having a first end and a second end, the first end being arranged closer to the base plate than the second end in the axial direction. The one or more inclined plane surface(s) of the first expansion tool is/are inclined away from the plunger axis ($a_1$) from the first end of each inclined plane surface to the second end of each inclined plane surface. The second expansion tool comprises one or more inclined plane surface(s), each inclined plane surface of the second expansion tool corresponding to an inclined plane surface of the first expansion tool. Each inclined plane surface of the second expansion tool has a first end and a second end, the first end being arranged further away from the base plate than the second end in the axial direction, each of the inclined plane surface(s) of the second expansion tool being inclined towards the plunger axis from the first end of the inclined plane surface to the second end of the inclined plane surface, each inclined plane surface of the first expansion tool contacting and applying pressure to the corresponding inclined plane surface of the second expansion tool when the expansible press plunger is in the radially expanded state.

The inclined plane surfaces of the second expansion tool may be arranged on the inner surface of the side wall of the second expansion tool.

The inner surface of the second expansion tool side wall may further comprise a first section extending in the axial direction, i.e., extending with substantially no inclination towards the axial direction or in other words towards the plunger axis. The first section of the inner surface is arranged between the top end and the inclined plane surfaces. In other words, the inclined plane surfaces of the second expansion tool are arranged closer to the bottom end than the first section of the inner surface of the expansion tool side wall. In an example, the first section may extend in the expansion tool side wall a distance in the range of 40-70% of the height of the second expansion tool as measured in the axial direction from the bottom end to the top end.

In an expansible press plunger as disclosed herein, the one or more inclined plane surface(s) of the first expansion tool may be inclined away from the plunger axis from the first end of each inclined plane surface to the second end of each inclined plane surface with an angle $\alpha$ to the axial direction and each of the inclined plane surface(s) of the second expansion tool may be inclined towards the plunger axis from the first end of the inclined plane surface to the second end of the inclined plane surface with an angle $\beta$ to the axial direction, the angle $\beta$ being greater that the angle $\alpha$ by a difference angle $\gamma$. The difference angle $\gamma$ may be in the range of from 1° to 3°. By arranging the inclined plane surfaces on the first and second expansion tools with a slight difference in angle, the expansion effect may be enhanced.

Transformation of the second expansion tool and thereby also the expansible press plunger from the unexpanded state to the expanded state is accomplished by moving the first expansion tool towards the base plate. The first expansion tool is moved downward inside of the side wall of the second expansion tool until the first end of each inclined plane surface of the first expansion tool meets a corresponding first end of an inclined plane surface of the second expansion tool. For example, the first end of each inclined plane surface of the first expansion tool may meet the corresponding first end of the inclined plane surface of the second expansion tool on a plane extending in a radial direction. Continued downward movement of the first expansion tool results in the one or more inclined plane surface(s) of the first and second expansion tools being gradually brought in contact with each other as the one or more inclined plane surface(s) of the first expansion tool slide(s) against the corresponding one or more inclined plane surface(s) on the second expansion tool until the inclined plane surface(s) on the first expansion tool are fully aligned with the inclined plane surface(s) on the second expansion tool. If there is a difference angle $\gamma$ between the angle $\alpha$ and the angle $\beta$ of the inclined surfaces on the first and second expansion tools, bringing the inclined plane surfaces on the first and the second expansion tool into alignment, will cause the angle $\gamma$ to be gradually decreased until it is completely obliterated when the expansible press plunger is in the fully expanded state. The force being applied from the first expansion tool to the side wall of the second expansion tool causes the side wall of the second expansion tool to be outwardly deflected in the radial direction whereby the circumferential edge portion of the second expansion tool increases in length i.e., the circumference of the second expansion tool increases at least at the bottom end of the second expansion tool. For example, the circumference of the second expansion tool increases more at the bottom end of the second expansion tool. Since the bottom end of the second expansion tool is deflected more than other parts of the second expansion tool, such as the first section and the upper parts of the inclined plane surfaces, the pressure against the container will be highest at the bottom end comprising the circumferential edge portion which is beneficial for forming a good sealing at the circumferential edge portion.

The second expansion tool is made of a material which can be repeatedly flexed and/or stretched without failing, such as a polymeric material. The material in the second expansion tool is preferably elastically flexible and/or extensible such that it returns to the non-expanded shape when the expansion force from the first expansion tool is removed. The second expansion tool as disclosed herein is a cup-shaped element which is arranged radially outside of the first expansion tool. For example, the cup-shaped element may have a hollow form of a cup, without a bottom and without a handle, to accommodate first expansion tool within the cup-shaped element. The cup-shaped element may be thin in relation to its other dimensions, such as its height and width. The first expansion tool is movable in the axial direction inside the second expansion tool during transformation of the expansible press plunger to the expanded state and during return of the expansible press plunger to the non-expanded state. Further, the second expansion tool is preferably made, e.g., by injection molding, in one integral piece, e.g., of the same material. In other words, the second expansion tool is preferably formed as one integral piece, e.g., of the same material. The sidewall of the second expansion tool above the inclined plane surfaces and the material which can be repeatedly flexed and/or stretched without failing makes it possible for the second expansion tool to be repeatedly outwardly deflected in the radial direction below the first end of the inclined plane surface of the second expansion tool in order to primarily direct the force from the press plunger at the circumferential edge portion.

In an expansible press plunger as disclosed herein, each inclined plane surface of the second expansion tool may be arranged on a wedge-shaped protrusion arranged on the inner surface of the side wall of the second expansion tool.

A cross section of the second expansion tool taken in a plane parallel with the radial direction may have a modified polygonal shape with at least three wall portions connected by at least three corner portions. A wedge-shaped protrusion with an inclined plane surface may be arranged in each corner portion of the second expansion tool. At least one wedge-shaped protrusion with an inclined plane surface may be arranged on each wall portion of the second expansion tool. Depending on the size of the wall portion, two or more wedge-shaped protrusions may be used on a wall portion. By arranging separate wedge-shaped protrusions in the corner portions and on the wall portions, the degree of expansion of the corner portion may be designed to be different from the degree of expansion of the wall portions between the corner portions. It may be beneficial to a sealing operation if the pressure applied to the materials to be sealed is higher in the corner portions of a container body, as the corner portions may require a higher sealing pressure than the wall portions in order to obtain a seal quality in the corner portions which is comparable to the seal quality in the wall portions. When bending a flat element such as a sealing disc and inserting the flat element into a container body with a sealing edge being deflected into alignment with the inner surface of the container body wall, surplus sealing disc material may form wrinkles and rugosities in the corner portions. In order to flatten such wrinkles and rugosities and create a tight seal between the sealing disc and the container body, a higher sealing pressure may be needed than in wall portions where the materials to be sealed lie flat against each other.

As used herein a modified polygonal shape, such as a modified triangular shape, a modified rectangular shape, a modified pentagonal shape, a modified hexagonal shape, etc. implies a shape having side portions connected by rounded corner portions. The side portions may be straight or may have a curvature which is less than a curvature of the corner portions.

In an expansible press plunger as disclosed herein, each inclined plane surface of the first expansion tool may be arranged on a wedge-shaped protrusion on the first expansion tool. When the inclined plane surface(s) on the first expansion tool and the inclined plane surface(s) of the second expansion tool are both arranged on wedge-shaped protrusions, each wedge-shaped protrusion on the first expansion tool is matched by and arranged to interact with a corresponding wedge-shaped protrusion on the second expansion tool. The wedge-shaped protrusion(s) on the first expansion tool taper in a downward direction, i.e., in a direction toward the base plate of the expansible press plunger and the wedge-shaped protrusion(s) on the second expansion tool taper in an upward direction, i.e., in a direction away from the base plate of the expansible press plunger.

When more than one wedge-shaped protrusion is arranged on the side wall of the second expansion tool, the wedge-shaped protrusions are arranged separated from each other in the circumferential direction of the side wall of the second expansion tool. Thereby, the different parts of the side wall of the second expansion tool carrying the wedge-shaped protrusions may move more freely in relation to each other when the second expansion tool is transformed from the unexpanded state to the radially expanded state. Further, the separation between the wedge-shaped protrusions allows different parts of the side wall of the second expansion tool to expand to different degrees. As set out herein, parts of the side walls forming corner portions of the second expansion tool may be arranged to attain a greater expansion than the parts of the side walls which are arranged between the corner portions.

In order to facilitate radial expansion of the second expansion tool, at least one expansion slit may be arranged in the expansion tool side wall of the second expansion tool, the expansion slit extending in the axial direction in the expansion tool side wall. If two or more wedge shaped protrusions are arranged on the side wall of the second expansion tool, it may be preferred that expansion slits are arranged to separate the wedge-shaped protrusions from each other and make them movable independently from each other.

The expansion slit or expansion slits may be arranged all the way from the top end of the second expansion tool to the bottom end of the second expansion tool or only in a selected part of the wall of the second expansion tool between the top end and the bottom end. Although generally less preferred, the expansion slit may be arranged such that it does not cut through the circumferential edge portion of the second expansion tool.

The expansion slit or expansion slits may divide the circumferential edge portion of the second expansion tool and may extend from the circumferential edge portion in the axial direction toward the top end of the second expansion tool. Each expansion slit may terminate at the same distance from the circumferential edge portion of the second expansion tool. Each expansion slit may terminate in an end opening in the side wall of the second expansion tool. The end opening may have any suitable shape such as circular, oval, a modified polygonal shape, etc., as set out herein. When multiple expansion slits are arranged in the side wall of the second expansion tool the slits may terminate in end openings arranged at the same level along the circumference of the side wall of the second expansion tool. The end openings serve to facilitate bending of a portion of the side wall located between two end openings along a hinge line formed between the end openings.

The second expansion tool as disclosed herein has a height in the axial direction. The expansion slit or expansion slits may extend in the expansion tool side wall a distance in the range of from 40% to 100% of the height of the second expansion tool, preferably from 40% to 70% or most preferably from 45% to 60%.

In an expansible press plunger as disclosed herein, a plurality of expansion slits may extend from the circumferential edge portion of the second expansion tool towards the top end. The expansion slits divide the circumferential edge portion into a plurality of edge portion segments.

Each expansion slit in the second expansion tool may be terminated in an end opening. The end openings are preferably arranged on a hinge line extending in a circumferential direction of the second expansion tool, perpendicular to the axial direction.

In an expansible press plunger as disclosed herein, the base plate may comprise a deformation control member, the deformation control member being arranged to limit radially inward deformation of the circumferential edge portion of the second expansion tool. The deformation control member prevents the circumferential edge portion of the second expansion tool from moving radially inward beyond the limit created by the deformation control member.

The deformation control member may take the form of a stop wall arranged on the upper surface of the base plate, the stop wall being inset from the circumferential edge of the bottom surface of the base plate. The stop wall prevents the circumferential edge portion of the second expansion tool from moving radially inward beyond the stop wall.

The second expansion tool may comprise a sealing ridge extending circumferentially on the outer surface of the second expansion tool side wall along all or part of the circumference of the second expansion tool side wall.

The second expansion tool may comprise a deformation tool, the deformation tool protruding radially from the outer surface of the second expansion tool side wall. The deformation tool may comprise or consists of an elongated bulge extending in a circumferential direction of the second expansion tool side wall, the elongated bulge extending over all or part of the circumference of the second expansion tool side wall.

The circumferential edge portion of the second expansion tool side wall may comprise or consist of the deformation tool. Hence, the circumferential edge portion may constitute a deformation tool.

In an expansible press plunger as disclosed herein and comprising a sealing ridge and a deformation tool, the sealing ridge may be arranged above the deformation tool as seen in the axial direction from the bottom end of the second expansion tool towards the top end of the second expansion tool. An expansible press plunger comprising a sealing ridge and a deformation tool may be used to both create a deformation in a container wall and to attach a sealing disc in a container body.

The deformation tool may e.g., be arranged for forming mating locking bulges in a closure arrangement in a packaging container, such as a packaging container as disclosed in WO 2017/180056 A1. WO 2017/180056 A1 discloses a paperboard packaging container for bulk solids. The paperboard packaging container comprises a tubular paperboard container body, a container bottom and a container lid. The container body extends in a longitudinal direction of the packaging container from a bottom end of the container body to a container opening. The container body comprises a container body abutment edge at the container opening. The container body has an inner surface facing towards an inner compartment in the packaging container and an outer surface facing away from the inner compartment. The container lid comprises a lid collar having an abutment edge adapted for abutting against the container body abutment edge, and a lid plug-in portion. The lid plug-in portion has a side surface extending in the longitudinal direction and facing the inner surface of the container body, when the container lid is in a closed position. The lid plug-in portion further comprises a main surface being located at a distance from the container body abutment edge when the container lid is in a closed position. The lid collar is made of the same material as the container body and the lid collar is delimited from the container body by a slit or by weakening means extending along the container body periphery for allowing the lid collar to be fully or partially separated from the container body at the abutment edges. The shape of the container opening is stabilized, either by (i) the paperboard packaging container comprising a partially removable transport closure attached to an inner surface of the container body and forming a roof over the inner compartment and/or (ii) by the container body comprising a multi-ply paperboard material including one or more layers of a polymeric film, a coating layer and/or metal foil. The paperboard packaging container is furthermore provided with a locking arrangement for retaining the container lid in the closed position. The locking arrangement comprises a first locking element in the form of a recess, provided on the inner surface of the container body, and a second locking element in the form of a protrusion, provided on the side surface of the lid plug-in portion, the first and second locking elements being mating locking elements. The first and second locking elements are arranged such that when the container lid is in the closed position the protrusion is in engagement with the recess.

The container lid and the plug-in portion of the paperboard packaging container are co-formed in the manufacturing procedure from one paperboard material sheet. The lid collar thus forms a contiguous continuation of the container body wall and the plug-in portion has the function of a plug, fitting tightly in the container opening in close contact with the inner surface of the container body. The interlocking locking elements of the locking arrangement assure that the container remains closed after closing. Closing the container requires a user to push the plug-in portion of the lid downwards in a fairly determined and forceful manner in order to overcome the resistance created as the protrusion of the second locking element is moved past the edges of the container wall. Accordingly, the abutment edge of the top member will hit the container body abutment edge with an increased force and thereby provide the consumer with an enhanced closure indication, such as a sensory snap-in indication and the audible signal e.g. in the form of a click sound, signalling to the user that the container is properly closed, which improves the user-experience with regards to the perception of a properly sealed container.

The container lid may be closed by pressing the plug-in portion into the container opening until the protrusion snaps into the recess and the lid collar abutment edge is closed against the container body abutment edge, which may be indicated to the user by a feeling of a slight resistance having to be overcome when pressing the lid in place, a snap-in or slide-in sensation and/or an audible signal such as a click sound or a squeaking or scratching sound being produced when the lid is closed on the container body. It may be generally preferred that a closure indication is provided as distinct sensation or sound, or a combination of a distinct sensation or sound as such signals may be perceived as providing a more definitive confirmation of a proper closing than an indistinct sensation or sound. Examples of distinct sensations are snap-in sensations while click or pop sounds may provide distinct sound sensations.

An expansible press plunger as disclosed herein, wherein the second expansion tool comprises both a sealing ridge and a deformation tool may be used to apply an inner sealing member and to form interengaging locking elements in a locking arrangement, e.g., as disclosed in WO 2017/180056 A1. Thus, applying the inner sealing member and welding it to the inner wall of a container body tube and forming a locking arrangement may be performed in a same process operation when manufacturing the packaging container. Application of the inner sealing member and forming a locking arrangement may take place simultaneously or sequentially. If carried out sequentially, the application of the inner sealing member and the forming of a locking arrangement may take place with or without an overlap in time. It is also conceivable that the duration of the application of the inner sealing member and the forming of a locking arrangement differ. For instance, it may require a longer process time to properly set the packaging material in the deformed configuration within the area of the locking arrangement.

The expansible press plunger as disclosed herein may comprise a first piston and a second piston, the first piston and the second piston extending in the axial direction with the second piston being coaxial with the first piston, the base plate being connected to the first piston with the bottom surface of the base plate extending perpendicular to the axial direction, the first expansion tool being connected to the second piston and the second expansion tool being connected to the first piston, the first piston and the second piston being arranged to be simultaneously movable in the axial direction as a unit and to be independently movable in relation to each other in the axial direction.

Disclosed herein is also an attachment unit for attaching a container sealing element to a container body, the attachment unit comprising an expansible press plunger as disclosed herein and a retaining device, the retaining device being adapted to retain the container body, the retaining device comprising at least one through-going positioning cavity being adapted to receive and hold a portion of the container body, the positioning cavity of the retaining device having a cross-sectional area defining a footprint area of the container body, the expansible press plunger being axially movable between an attachment position inside the positioning cavity of the retaining device and a rest position outside the positioning cavity of the retaining device.

The retaining device may comprise a welding unit, such as a welding unit comprising an induction coil, the welding unit preferably being arranged around the positioning cavity.

The positioning cavity of the retaining device may comprise an indentation being arranged in a wall of the positioning cavity, the indentation corresponding to a deformation tool protruding radially from the outer surface of the second expansion tool side wall, the deformation tool being arranged to nest inside the indentation when the expansible press plunger is in the attachment position. The outer surface of the second expansion tool side wall may comprise a single deformation tool or multiple deformation tools with the positioning cavity comprising a single indentation or multiple indentations matching the deformation tool or tools on the outer surface of the second expansion tool side wall. The cooperating deformation tool and indentation may be used to create any desired shape of a deformation in a container wall such as elongated ridges/grooves, discrete protrusions/depressions, etc.

The cross-sectional area of the positioning cavity may comprise a plurality of side portions being connected by corner portions, the bottom surface of the base plate and the circumferential edge portion of the first expansion tool in the unexpanded state each comprising a plurality of corresponding side portions being connected by corner portions.

Disclosed herein is also a method for sealing a packaging container using the attachment unit with the expansible press plunger as disclosed herein, the method comprising:

placing a container body in the positioning cavity of the retaining device with a body wall of the container body being aligned with a wall of the positioning cavity;

applying a container sealing element to the bottom surface of the base plate, the container sealing element comprising an attachment border extending radially outward of the circumferential edge of the bottom surface;

moving the container sealing element in the axial direction of the attachment unit to an attachment position within the container body by means of the expansible press plunger and simultaneously flexing the attachment border of the container sealing element into alignment with the body wall of the container body;

gradually transforming the expansible press plunger from the unexpanded state to the radially expanded state by moving the first expansion tool in the axial direction towards the upper surface of the bottom plate and causing the inclined plane surface of the first expansion tool to contact and slide against the inclined plane surface of the second expansion tool, whereby the side wall of the second expansion tool is subjected to a biasing force causing the side wall of the second expansion tool to move in a direction away from the plunger axis of the expansible press plunger and to press the attachment border of the container sealing element in the radial direction towards the body wall of the container body;

welding the attachment border of the container sealing element to the body wall of the container body.

The attachment border of the container sealing element may be pressed against the body wall of the container body by a sealing ridge arranged on the second expansion tool, the sealing ridge extending circumferentially on the outer surface of the expansion tool side wall along the circumference of the expansion tool side wall of the second expansion tool. Welding the attachment border of the container sealing element to the body wall of the container body is performed along the sealing ridge. The sealing ridge is preferably arranged such that it extends around the full circumference of the expansion tool side wall.

The second expansion tool may comprise a deformation tool protruding radially from the outer surface of the expansion tool side wall, the positioning cavity of the retaining device comprising a corresponding indentation being arranged in a wall of the positioning cavity, the method further comprising the step of deforming the attachment border of the container sealing element and the body wall of the container body by radially pressing the deformation tool into the indentation in the wall of the positioning cavity. This process step may produce a locking arrangement as disclosed herein or may be a way to provide a container wall with a shape deviating from the original planar shape of the packaging material. Deformed portions of the container wall may be provided for providing technical functions such as locking elements or stiffening elements and/or may have a decorative or information purpose such as a decorative relief pattern, text, logos, etc.

In the method as disclosed herein, a plurality of container sealing elements may be simultaneously inserted into and positioned in a plurality of corresponding container bodies by a plurality of attachment units, each attachment unit inserting and positioning a sealing element into a corresponding container body. The container sealing elements may subsequently be simultaneously attached to the corresponding container bodies by means of welding, as set out herein.

BRIEF DESCRIPTION OF THE DRAWINGS

The present invention will hereinafter be further explained by means of non-limiting examples with reference to the appended drawings wherein.

DETAILED DESCRIPTION

Figure 1:
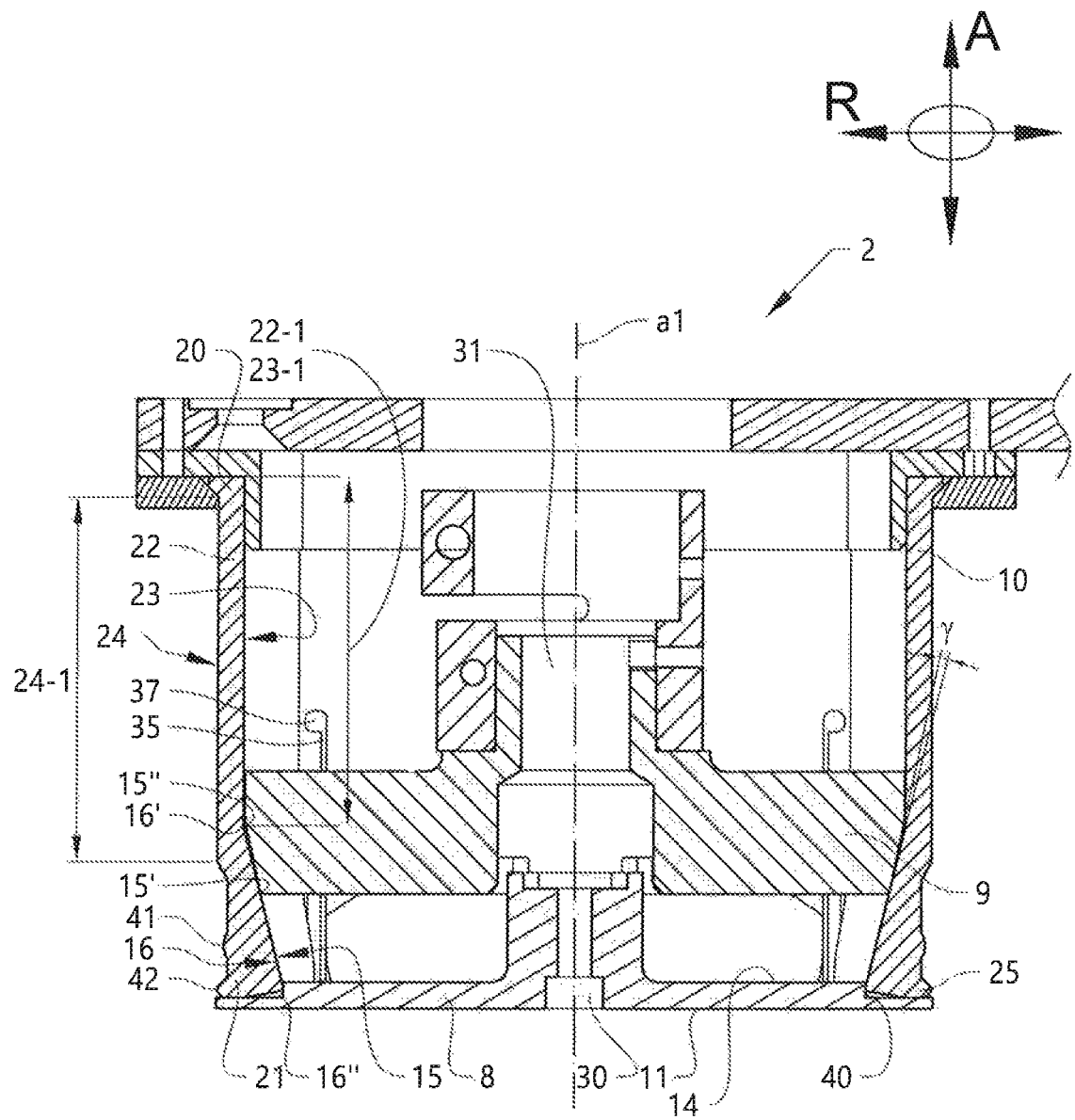
FIG. 1 shows a cross sectional view of an expansible press plunger as disclosed herein.

With reference to FIG. 1, there is shown an expansible press plunger 2.

The expansible press plunger 2 has a plunger axis $a_1$ extending in an axial direction A perpendicular to a radial direction R. The expansible press plunger 2 is expansible in the radial direction R and comprises a base plate 8, a first expansion tool 9 and a second expansion tool 10. The first expansion tool 9 and the second expansion tool 10 are movable together as a unit as well as in relation to each other in the axial direction A. The base plate 8 has a bottom surface 11 and an upper surface 14 opposite the bottom surface 11. The base plate 8 is arranged with the upper surface 14 facing the first expansion tool 9 and the second expansion tool 10 in the axial direction A.

Figure 4:
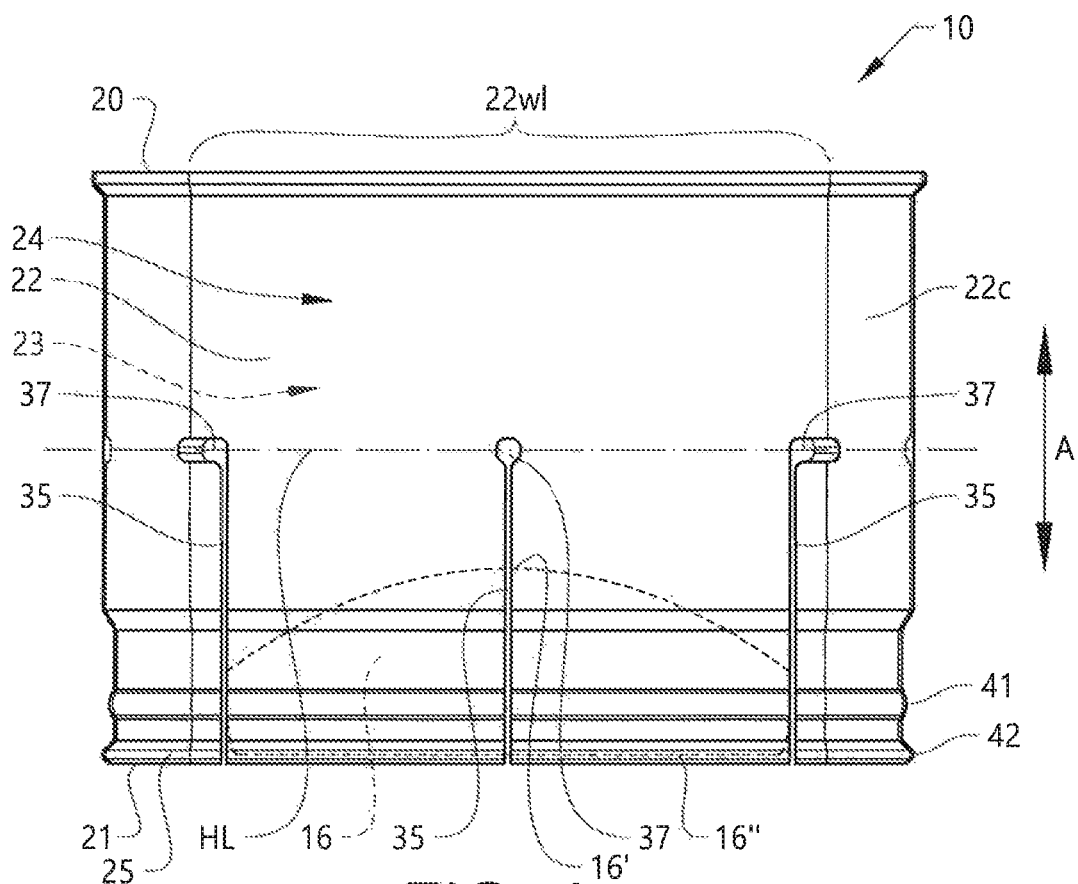
FIG. 4 shows a side view of the second expansion tool in the expansible press plunger in FIG. 1.
Figure 5:
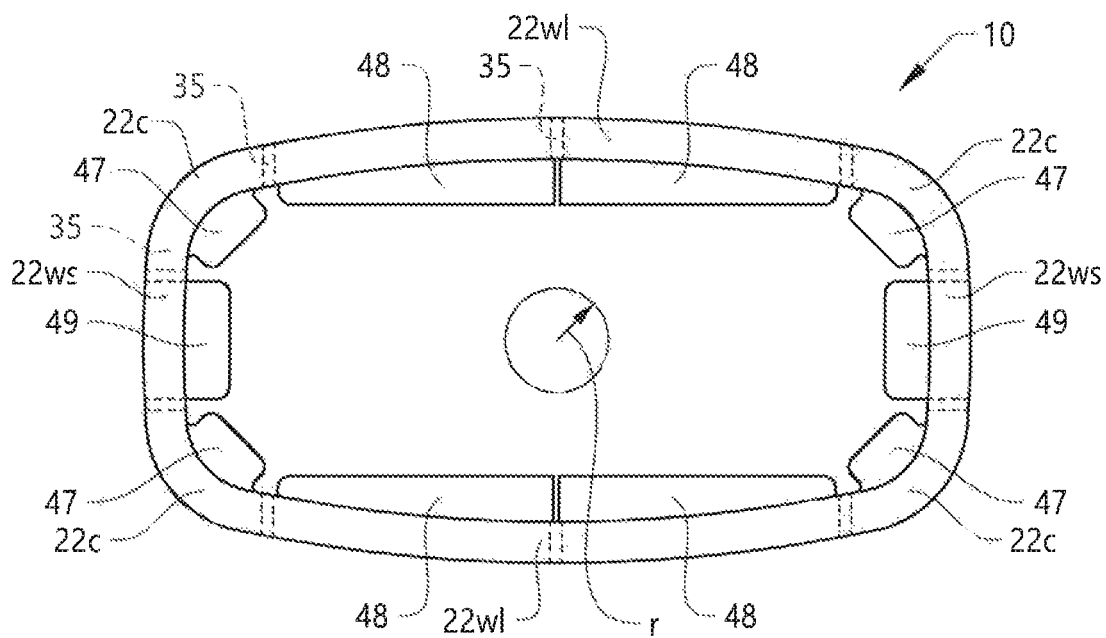
FIG. 5 shows a top view of the second expansion tool shown in FIG. 4.

With reference to FIGS. 4 and 5, the second expansion tool 10 has a top end 20 and a bottom end 21 and comprises an expansion tool side wall 22 having an inner surface 23 and an outer surface 24, the expansion tool side wall 22 extending from the top end 20 to the bottom end 21 of the second expansion tool 10. The expansion tool side wall 22 comprises a circumferential edge portion 25 at the bottom end 21 of the second expansion tool 10, the circumferential edge portion 25 of the second expansion tool 10 being arranged outward of the first expansion tool 9 in the radial direction. The second expansion tool 10 is transformable between an unexpanded state and a radially expanded state as will be further described with reference to FIGS. 7 and 8. As illustrated by the cross section of the second expansion tool in FIG. 1 the expansion tool side wall 22 may be thin in relation to its other dimensions, such as its height.

The second expansion tool 10 comprises one or more inclined plane surface(s) 16. More specifically, the inclined plane surfaces 16 may be arranged on the inner surface 23 of the expansion tool side wall 22. The inner surface 23 of the expansion tool side wall 22 may further comprise a first section 23-1 extending in the axial direction A, i.e., extending with substantially no inclination towards the axial direction A. The first section 23-1 of the inner surface 23 is arranged between the top end 20 and the inclined plane surfaces 16.

The side wall 22 of the second expansion tool 10 may also comprise a first section 22-1, which may be arranged between the top end 20 and the inclined plane surface 16 and may extend in the axial direction A, i.e., extend with substantially no inclination towards the axial direction A. Also the outer surface 24 may comprise a first section 24-1 extending in the axial direction A, i.e., extending with substantially no inclination towards the axial direction A.

Figure 2:
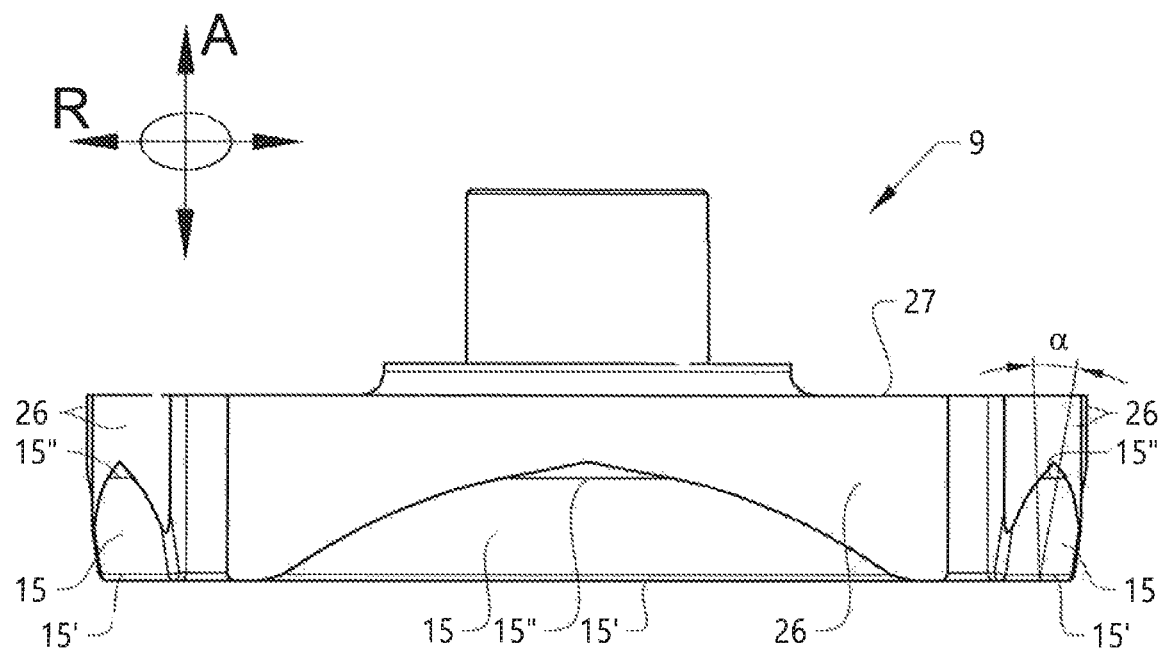
FIG. 2 shows a side view of the first expansion tool in the expansible press plunger in FIG. 1.
Figure 3:
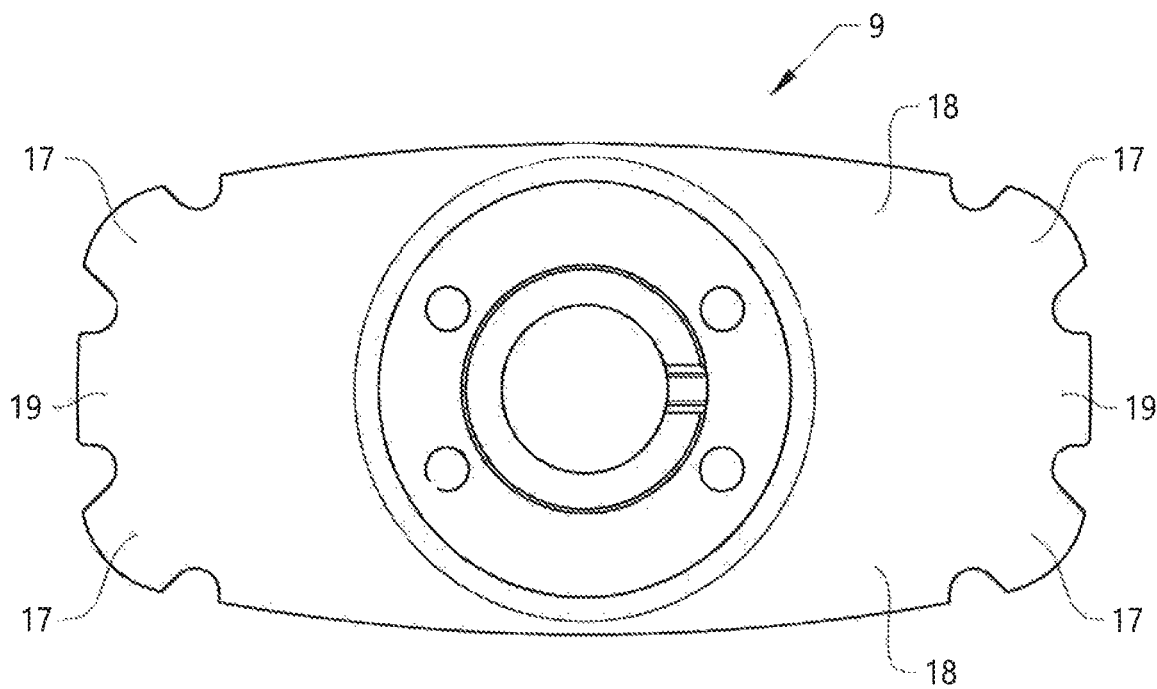
FIG. 3 shows a top view of the first expansion tool shown in FIG. 2.

As seen in FIGS. 2 and 3, the first expansion tool 9 comprises a plurality of inclined plane surfaces 15. The inclined plane surfaces 15 are arranged facing the inner surface 23 of the expansion tool side wall 22 of the second expansion tool 10. Each inclined plane surface 15 of the first expansion tool 9 has a first end 15' and a second end 15", the first end 15' being arranged closer to the base plate 8 than the second end 15" in the axial direction A. Thus, the inclined plane surfaces 15 are inclined away from the plunger axis $a_1$ from the first end 15' of each inclined plane surface 15 to the second end 15" of each inclined plane surface 15. Further, the inclined plane surfaces 15 may also be inclined away from the inner surface 23 of the side wall 22 of the second expansion tool 10 in the axial direction A. More specifically, the inclined plane surfaces 15 may also be inclined away from the first section 23-1 of the inner surface 23 of the side wall 22 of the second expansion tool 10 in the axial direction A.

The first expansion tool 9 may further comprise a plurality of second surfaces 26 which may extend in the axial direction A, that is along the plunger axis $a_1$. Thus, in some embodiments the second surfaces 26 are not inclined with respect to the plunger axis $a_1$, and thus not inclined from the first section 23-1 of the inner surface 23 of the side wall 22 in the axial direction A. Each second surface 26 may be arranged further away from the base plate 8 than the inclined plane surfaces 15 in the axial direction A. For example, as illustrated in FIG. 2, each second surface 26 may extend between a top end 27 of the first expansion tool 9 and the inclined plane surface 15. The second surfaces 26 may be plane surfaces.

In the example shown in the figures, the first expansion tool 9 has eight inclined surfaces 15, each inclined surface 15 being arranged on a wedge-shaped protrusion 17, 18, 19. The wedge-shaped protrusion 17, 18, 19 and the inclined surfaces 15 being arranged such that they will face the inner surface 23 of the expansion tool side wall 22 of the second expansion tool 10 when the first expansion tool 9 is inserted into the second expansion tool 10. The first expansion tool 9 which is shown in FIGS. 2 and 3 is configured for being used when inserting and attaching a container sealing element into a container body having a modified rectangular cross-section with four side wall portions being connected by four rounded corner portions. Four wedge-shaped protrusions 17 are arranged in corner portions of the first expansion tool 9, a first pair of opposing wedge-shaped protrusions 18 is arranged on a first pair of side portions of the first expansion tool 9 and a second pair of opposing wedge shaped protrusions 19 is arranged along a second pair of side portions of the first expansion tool 9. In the example shown in FIGS. 2 and 3, the wedge-shaped protrusions of the first pair of wedge-shaped protrusions 18 have a greater extension in the circumferential direction of the first expansion tool 9 than the wedge-shaped protrusions of the second pair of wedge-shaped protrusions 19.

In a process for inserting and attaching a container sealing element in a container body, the wedge shaped protrusions 17, 18, 19 on the first expansion tool 9 will be positioned at corresponding wall portions of the container body. Accordingly, the wedge-shaped protrusions 17 which are arranged on the corner portions of the first expansion tool 9 will be arranged at corresponding corner portions of the container body. The wedge-shaped protrusions 18 which are arranged on the longer sides of the first expansion tool 9 will be arranged at long side wall portions of the container body and the wedge-shaped protrusions 19 which are arranged on the shorter sides of the first expansion tool 9 will be arranged at short side wall portions of the container body. As set out herein, the expansible press plunger is not limited to being an expansible press plunger for use when manufacturing a packaging container having a modified rectangular cross-section. The expansible press plunger as disclosed herein may be used when producing a packaging container having any useful shape, including circular, oval, and polygonal shapes. It is to be understood that the number and location of wedge-shaped protrusions carrying inclined plane surfaces on the first expansion tool should be adapted to the configuration of the particular packaging container to be produced.

The inclined plane surfaces 15 of the first expansion tool 9 are inclined towards the plunger axis $a_1$ from the second end 15" of each inclined plane surface 15 to the first end of each inclined plane surface 15 with an angle α to the axial direction A.

The second expansion tool 10 in FIGS. 4 and 5 has a modified rectangular cross-sectional shape, which corresponds to the shape of the first expansion tool 9, such that the first expansion tool 9 can be inserted and fit into the interior of the second expansion tool 10. The second expansion tool 10 has two long wall portions 22wl and two short wall portions 22ws which are connected by four corner portions 22c.

Figure 9:
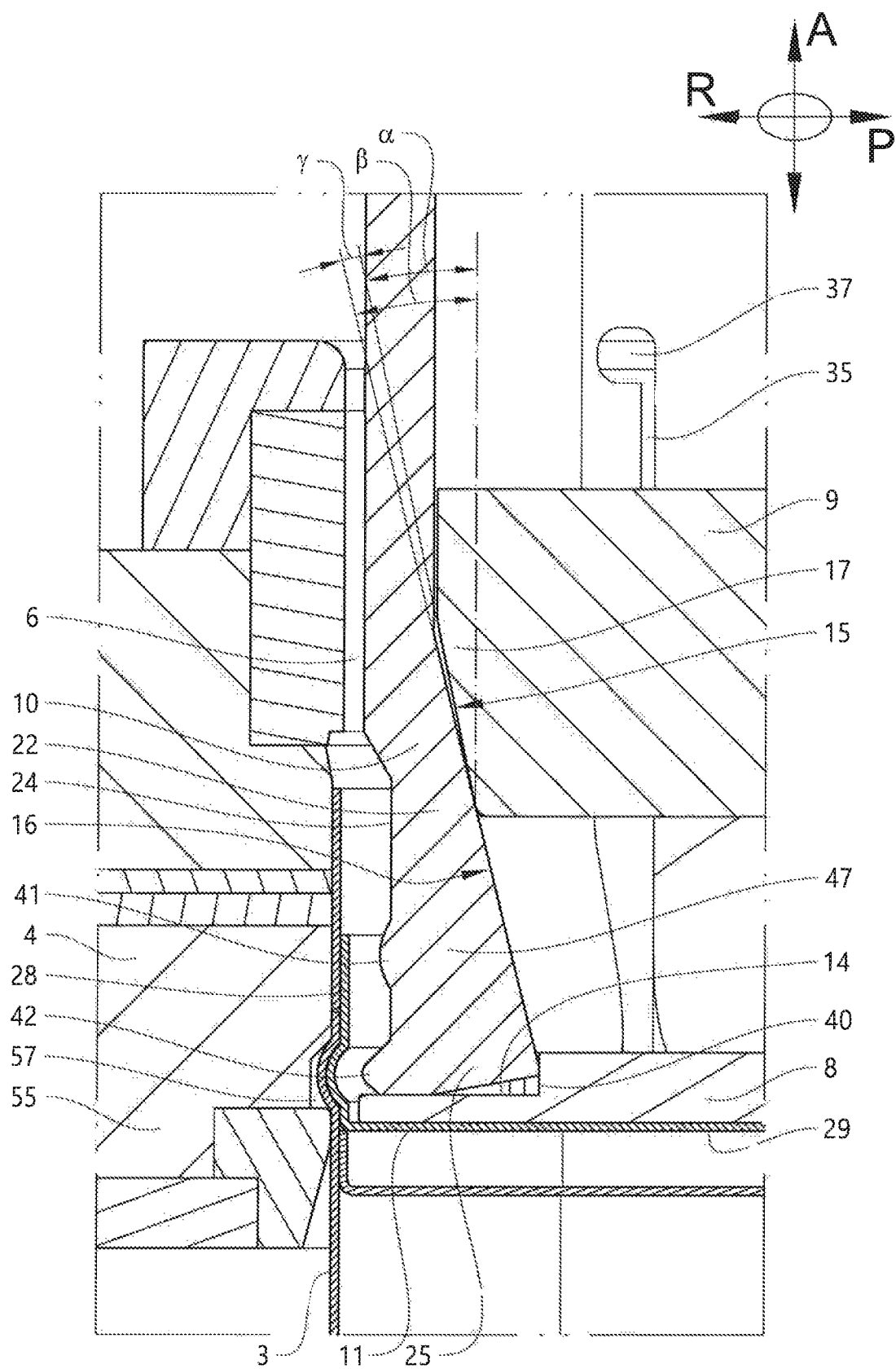
FIG. 9 shows a cross section of a detail of the attachment unit in FIG. 7 while being used in a method as disclosed herein.

The second expansion tool 10 comprises eight inclined plane surfaces 16 corresponding to the eight inclined plane surfaces 15 of the first expansion tool 9. Each of the inclined plane surfaces 16 of the second expansion tool has a first end 16' and a second end 16", the first end 16' being arranged further away from the base plate 8 than the second end 16" in the axial direction A. As seen in FIG. 9, the inclined plane surfaces 16 of the second expansion tool 10 are inclined towards the plunger axis $a_1$ from the first end 16' of the inclined plane surface to the second end 16" of the inclined plane surface 16 with an angle β to the axial direction A, the angle β differing from the angle α by a differing angle γ, the angle γ being within the range of from 1° to 3°. As disclosed herein, a difference in inclination between an inclined plane surface 15 on the first expansion tool 9 and the corresponding inclined plane surface 16 on the second expansion tool 10 is not a requirement in an expansible press plunger 2 as disclosed herein.

The inclined plane surfaces 16 of the second expansion tool 10 are arranged on wedge-shaped protrusions 47, 48, 49, which are arranged on the inner surface 23 of the expansion tool side wall 22 and which protrude radially inward from the inner surface 23 of the expansion tool side wall 22.

The second expansion tool 10 comprises a first set of wedge-shaped protrusions 47 each wedge-shaped protrusion having an inclined plane surface 16 and being arranged in a corner portion 22c of the second expansion tool 10. The second expansion tool 10 further comprises a second set of wedge-shaped protrusions 48 which are arranged with two wedge shaped protrusions 48 on each of the opposing long wall portions 22wl and a third set of wedge-shaped protrusions 49 which are arranged with one wedge shaped protrusion 49 on each of the short wall portions 22ws. Accordingly, each of the inclined plane surfaces 16 which are arranged at the long wall portions 22wl is divided into two part surfaces by the partition between the two wedge shaped protrusions 48 on each of the long wall portions 22wl.

As is seen in FIG. 4, expansion slits 35 are arranged in the expansion tool side wall 22 of the second expansion tool 10. The expansion slits 35 extend in the axial direction A in the expansion tool side wall 22 from the circumferential edge portion 25 of the second expansion tool 10 and divides the circumferential edge portion 25 into a plurality of edge portion segments. In the example shown in FIG. 4, the expansion slits 35 extend in the order of 50% of the distance from the bottom end 21 to the top end 20 of the second expansion tool 10. Such arrangement of the expansion slits 35 is not a prerequisite of the expansible press plunger 2 as disclosed herein. The expansion slits 35 may extend in the expansion tool side wall 22 a distance in the range of from 40% to 100% of the height of the second expansion tool 10 as measured between the top end 20 and the bottom end 21 of the second expansion tool 10. It may be preferred that the expansion slits 35 extend less than the full height of the second expansion tool 10, such as in the range of from 40% to 70% or most preferably in the range of from 45% to 60% of the height of the second expansion tool 10 as measured in the axial direction A from the bottom end 21 to the top end 20.

The disposition of expansion slits 35 may be different from that shown in FIG. 4, e.g., with only one, or more than two expansion slits 35 arranged in the long wall portions 221 of the second expansion tool 10. Furthermore, the expansion slits 35 may differ in length and/or in width. It is generally preferred that the expansion slits 35 have the same length and terminate at the same height in order to provide a hinge function along a hinge-line HL formed between the ends of the expansion slits 35, as illustrated by FIG. 4.

The expansion slits 35 are arranged between the wedge-shaped protrusions 47, 48, 49 which are arranged on the inner surface 23 of the expansion tool side wall 22. Each expansion slit 35 terminates in an end opening 37 in the side wall 22 of the second expansion tool 10. The end opening 37 may have any suitable shape such as circular, oval, square, triangular, etc. By arranging the end openings 37 at the same level along the circumference of the side wall 22 of the second expansion tool 10, the end openings 37 serve to enhance the hinge-effect along the hinge-line HL formed between the ends of the expansion slits 35, by facilitating bending of a portion of the side wall located between two end openings 37 along the hinge-line HL.

Figure 6:
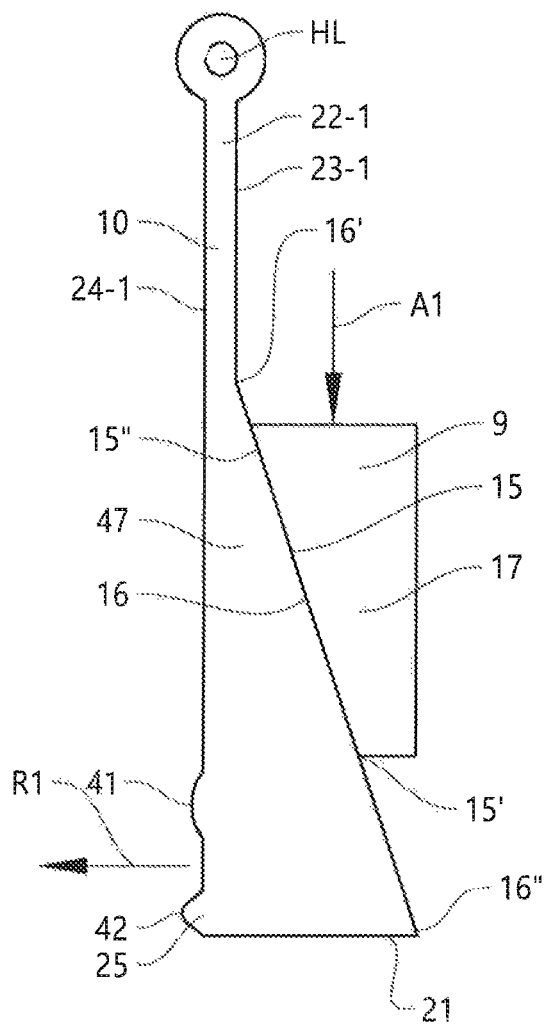
FIG. 6 shows a schematic cross-sectional view of a first expansion tool and a second expansion tool.

FIG. 6 is a schematic illustration of how a wedge shaped protrusion 17 with an inclined plane surface 15 belonging to the first expansion tool 9 relates to a wedge shaped protrusion 47 with an inclined plane surface 16 belonging to the second expansion tool 10. When the first expansion tool 9 is moved downward in the axial direction A, as indicated by the arrow A1, the inclined plane surface 15 on the first expansion tool 9 slides against the corresponding inclined plane surface 16 on the second expansion tool 10 and exerts pressure on the second expansion tool 10 in the radial direction R, as indicated by the arrow R1. The side wall 22 of the second expansion tool 10 will thereby be caused to bend at the hinge-line HL such that the circumferential edge portion 25 of the second expansion tool 10 is moved radially outward. As mentioned above, the first section 23-1 of the inner surface 23 and the first section 22-1 of the side wall 22 is arranged between the top end 20 (not shown in FIG. 6) and the inclined plane surface 16. As indicated in FIG. 6, the inclined plane surfaces 16 of the second expansion tool 10 are arranged below the first section 23-1 of the inner surface 23 of the expansion tool side wall 22. That is, the inclined plane surfaces 16 are arranged closer to the bottom end 21 than the first section 23-1 is in the axial direction. The inclined plane surfaces 16 may in turn be arranged between the hinge line HL and the bottom end 21. In some embodiments, such as the embodiment of FIG. 6, the first sections 22-1, 23-1 extend somewhat below the HL. For example, the first sections 22-1, 23-1 may extend below the hinge line HL with between 0 and 40% of the distance between the bottom end 21 and the hinge line HL. In another example, the first section 22-1 of the expansion tool side wall 22 extends a distance in the range of 40-70% of the height of the second expansion tool 10 as measured in the axial direction A from the bottom end 21 to the top end 20. Correspondingly, the first section 23-1 of the inner surface 23 may extend on the inner surface 23 of the expansion tool side wall 22 a distance in the range of 40-70% of the height of the second expansion tool 10 as measured in the axial direction A from the bottom end 21 to the top end 20. Preferably, the first section 23-1 may extend in the expansion tool side wall 22 a distance in the range of 60-70% of the height of the second expansion tool 10. Thus, in FIG. 6 only a lower part of the first section 23-1 of the inner surface 23 is shown.

The second expansion tool 10 further comprises a sealing ridge 41 extending circumferentially on the outer surface 24 of the second expansion tool side wall 22 along the circumference of the second expansion tool side wall 22. While the sealing ridge 41 preferably extends along the full circumference of the second expansion tool side wall 22, it is conceivable that the second expansion tool 10 has a sealing ridge which extends only along a part or parts of the circumference of the second expansion tool side wall 22.

The second expansion tool 10 further comprises a deformation tool 42 protruding in the radial direction R from the outer surface 24 of the second expansion tool side wall 22.

In the example shown in the figures, the deformation tool 42 consists of an elongated bulge forming part of the circumferential edge portion 25 of the second expansion tool side wall 22 and extending circumferentially along the full circumference of the second expansion tool side wall 22. It is to be understood that the deformation tool 42 may be placed at a distance from the circumferential edge portion 25 of the second expansion tool side wall 22 and/or that the deformation tool 42 may extend only along a part or parts of the circumference of the second expansion tool side wall 22.

As is seen in the figures, the sealing ridge 41 is arranged above the deformation tool 42 as seen in the axial direction A from the bottom end 21 of the second expansion tool 10 towards the top end 20 of the second expansion tool 10.

Transformation of the second expansion tool 10 and thereby also the expansible press plunger 2 from the unexpanded state to the expanded state is accomplished by moving the first expansion tool 9 towards the base plate 8. The first expansion tool 9 is moved downward in the axial direction A inside of the side wall 22 of the second expansion tool 10 until the first end 15' of each inclined plane surface 15 of the first expansion tool 9 meets a corresponding first end 16' of an inclined plane surface 16 of the second expansion tool 10. Continued downward movement of the first expansion tool 9 results in the inclined plane surfaces 15, 16 of the first and second expansion tools 9, 10 being gradually brought in contact with each other as the inclined plane surfaces 15 of the first expansion tool 9 slide against the corresponding inclined plane surfaces 16 on the second expansion tool 10 until the difference angle γ between the inclined plane surfaces is obliterated and the inclined plane surfaces 15 on the first expansion tool 9 are fully aligned with the inclined plane surfaces 16 on the second expansion tool 10. Bringing the inclined plane surfaces 15, 16 on the first and the second expansion tool 9,10 into alignment, results in a radially outward force being applied from the first expansion tool 9 to the side wall 22 of the second expansion tool 10, causing the corresponding part of the side wall 22 of the second expansion tool 10 to be outwardly deflected in the radial direction whereby the circumferential edge portion 25 of the second expansion tool 10 increases in length. As the side wall 22 of the second expansion tool 10 is caused to gradually flex radially outward when the inclined plane surface 15 on the first expansion tool 9 moves downwards in the axial direction A, the difference angle γ between the angle α and the angle β is gradually obliterated such that the first and second inclined plane surfaces 15, 16 are completely aligned and in contact with each other when the first expansion tool 9 has moved to an end position inside the second expansion tool 10.

During expansion of the second expansion tool 10, the segments of the side wall 22 which are located between the expansion slits 35 will be caused to flex radially outwardly along the hinge line HL which is formed between the end openings 37. Hence, the segments of the side walls 22 between the expansion slits 35 may flex outwardly independently of each other. By selecting the angles α and β, the degree of flexing and thereby the degree of expansion may be different in different parts of the second expansion tool 10. By way of example, it may be desirable that the second expansion tool 10 has greater expansibility in corner portions of the side wall 22 than in wall portions connecting the corner portions.

When the press plunger 2 and the second expansion tool 10 is in the fully expanded state, any feature on the outside surface 24 of the side wall 22 of the second expansion tool 10 such as a sealing ridge 41 and/or a deformation tool 42 may be used to form a seal between a container body wall and a sealing member inserted into the container body and/or to deform a portion of a container body wall as described herein.

Figure 7:
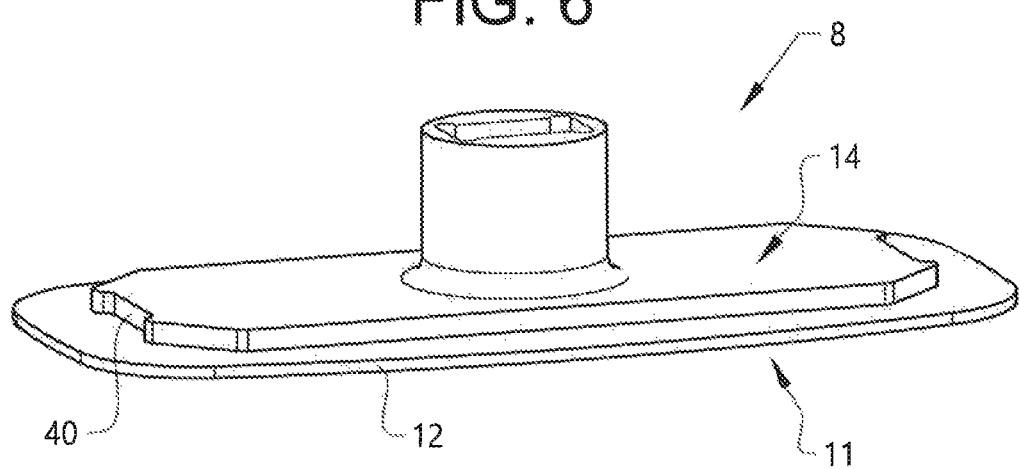
FIG. 7 shows a side view of the base plate in the expansible press plunger in FIG. 1.

FIG. 7 shows the base plate 8 comprising a deformation control member 40. The deformation control member 40 is arranged to limit radially inward deformation of the circumferential edge portion 25 of the second expansion tool 10 by prohibiting that the circumferential edge portion 25 can be moved too far in towards the plunger axis $a_1$. The deformation control member 40 as shown in FIG. 7 is provided in the form of a stop wall arranged on the upper surface 14 of the base plate, the stop wall being inset from the circumferential edge 12 of the base plate. The stop wall restricts radially inward movement of the circumferential edge portion 25 of the second expansion tool 10 as is seen in FIG. 9.

Figure 8:
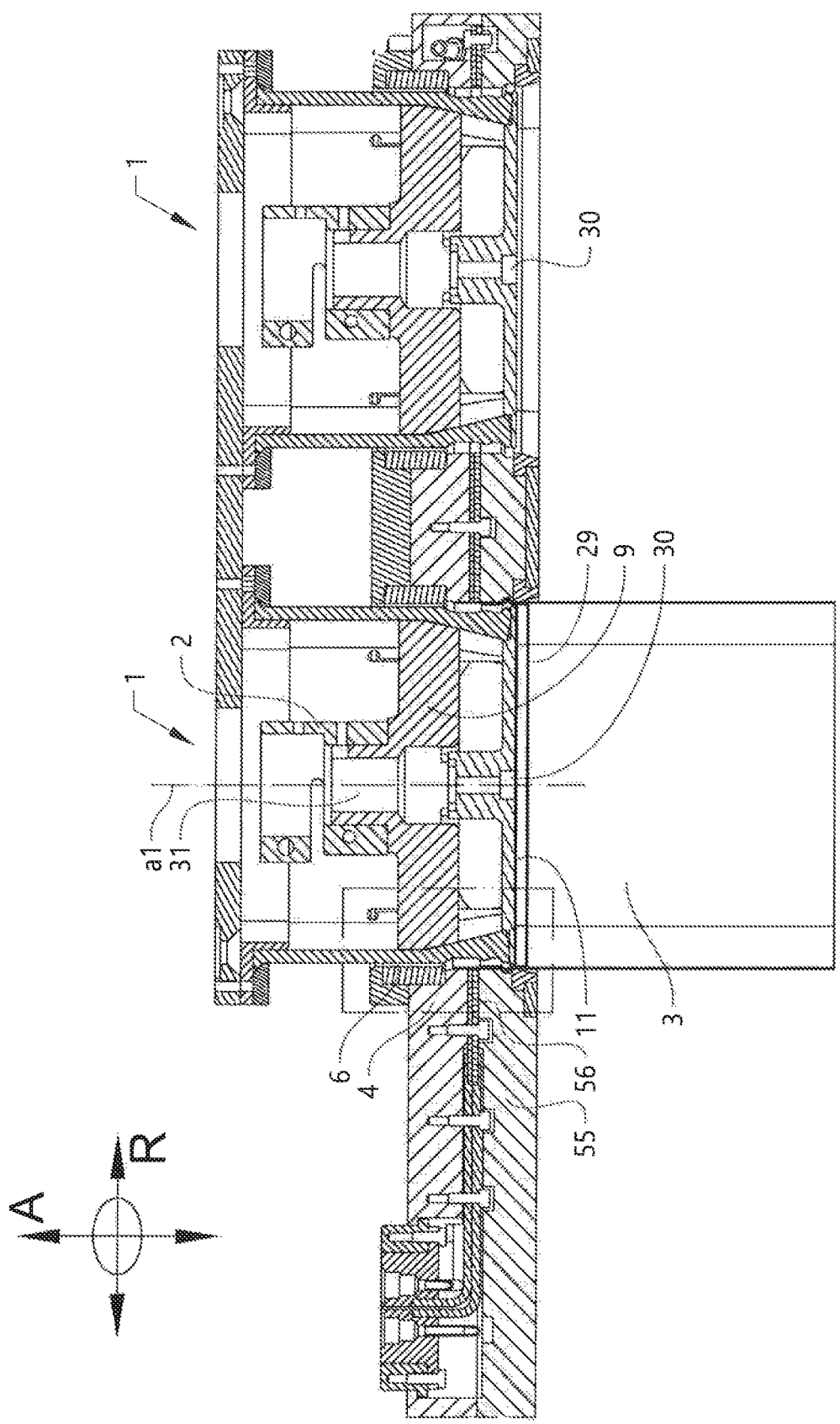
FIG. 8 shows a cross sectional view of an attachment unit as disclosed herein and comprising the expansible press plunger in FIG. 1.

FIG. 8 shows two attachment units 1 arranged side-by-side, each attachment unit 1 comprising an expansible press plunger 2 and a retaining device 4 comprising a through-going positioning cavity 6. Each attachment unit 1 is configured for attaching a container sealing element 29 to a container body 3 and for forming mating locking provisions by deforming a selected portion or selected portions of the container body. The positioning cavity 6 is adapted to receive and hold a portion of the container body 3 in position during processing of the container body 3 in the attachment unit 1. The positioning cavity 6 of the retaining device 4 has a cross-sectional area which defines a footprint area of a container body 3 inserted into the positioning cavity 6.

The expansible press plunger 2 comprises a first piston 30 and a second piston 31, both extending in the axial direction A with the second piston 31 being coaxial with the first piston 30. The base plate 8 is connected to the first piston 30 with the bottom surface 11 of the base plate 8 extending perpendicular to the axial direction A. The first expansion tool 9 is connected to the second piston 31 and the second expansion tool 10 is connected to the first piston 30. The first and second pistons 30, 31 are arranged to be moved simultaneously as a single unit in the axial direction A to enable the expansible press plunger 2 to be positioned in a container body, as well as being independently movable in relation to each other to enable expansion of the second expansion tool 10 by moving the first expansion tool 9 towards the base plate 8, as described herein.

The attachment unit 1 which is shown in the figures is configured for forming packaging containers having a modified rectangular cross-sectional area. The cross-sectional area may also be referred to as the footprint area of the packaging container. The first and second expansion tools 9, 10, the bottom surface 11 of the base plate 8 and the cross-sectional area of the positioning cavity 6 each also has a modified rectangular cross-sectional area with side wall portions which are interconnected by rounded corner portions. It is to be understood that the modified rectangular shape shown in the figures is provided only as a non-limiting example of a useful shape and that any useful cross-sectional or footprint shapes are conceivable such as circular, oval, or modified polygonal shape. As used herein a modified polygonal shape, such as a modified rectangular shape implies a shape having side portions connected by rounded corner portions. The side portions may be straight or may have a curvature which is less than a curvature of the corner portions.

The expansible press plunger 2 is axially movable between an attachment position inside the positioning cavity 6 of the retaining device 4 and a rest position outside the positioning cavity 6 of the retaining device 4. FIG. 8 shows the attachment unit 1 with the expansible press plunger 2 inserted into the positioning cavity 6 after having returned from an expanded state and before being removed from the positioning cavity 6 after completion of a welding and container wall deformation operation.

As shown in FIG. 9, the deformation control member 40 on the base plate 8 is provided in the form of a stop wall arranged on the upper surface 14 of the base plate 8. The deformation control member 40 is arranged to limit radially inward movement of the circumferential edge portion 25 of the second expansion tool 10. Thus, the stop wall prevents the circumferential edge portion 25 of the second expansion tool 10 to be pressed radially inward.

In the example shown in FIGS. 8 and 9, the sealing ridge 41 on the outer surface 24 of the second expansion tool side wall 22 extends along the full circumference of the second expansion tool side wall 22. Although such configuration is generally preferred as it produces a continuous seal along the circumference of the second expansion tool 10, it is to be understood that intermittent sealing ridges and sealing ridges extending only along a part or parts of the circumference of the second expansion tool may be used within the scope of the invention.

On the second expansion tool 10 shown in FIGS. 4, 8 and 9, the deformation tool 42 on the outer surface 24 of the second expansion tool 10 is formed by the circumferential edge portion 25 of the second expansion tool side wall as a thickened portion of the expansion tool side wall 22. Although the deformation tool 42 is shown in FIG. 4 to extend over the full circumference of the second expansion tool 10, it is to be understood that it may extend only over a part or parts of the circumference of the second expansion tool 10, that it may be placed in another location on the outer surface 24 of the expansion tool side wall 22 and/or may have other shapes, as set out herein. The deformation tool 42 is used for deforming the material in a packaging container wall to produce features in the container wall which deviate from the original planar shape of the packaging material. The packaging material is suitably a paper based packaging material, such as a laminate having a substrate layer of carton and one or more additional layer such as plastic, aluminium foil etc. laminated to the substrate layer. Such materials are readily deformable in a process as disclosed herein.

The retaining device 4 of an attachment unit 1 as shown in FIGS. 8 and 9 comprises a high frequency induction welding unit 55 comprising an induction coil 56. The high frequency induction welding unit 55 surrounds the positioning cavity 6 at a level corresponding to the position of the sealing ridge 41 on the second expansion tool 10 when the expansible press plunger 2 is brought to an attachment position in the positioning cavity 6 as shown in FIGS. 8 and 9.

The positioning cavity 6 of the retaining device 4 comprises an indentation 57 which is arranged in a wall of the positioning cavity 6. The indentation 57 is arranged to accommodate the deformation tool 42 on the second expansion tool 10, the deformation tool 42 being arranged to nest inside the indentation 57 when the expansible press plunger 2 is in the attachment position.

When the expansible press plunger 2 is inserted into a container body 3 in the positioning cavity 6 and has been brought into the fully expanded state, the deformation tool 42 is pressed into the indentation 57. The wall material of the container body 3 and the attachment border 28 of the container sealing element 29 are located between the outer surface 24 of the side wall 22 of the second expansion tool 10 and the wall of the positioning cavity, as seen in FIG. 9. By pressing the deformation tool 42 into the indentation 57 in the wall of the positioning cavity 6, the container body material and the attachment border 28 of the container sealing element 29 will also be pressed into the indentation 57 and will be deformed to create a bulge in the wall material.

Welding of the attachment border 28 of the container sealing element 29 to the container body wall is carried out along the sealing ridge 41 by activating the induction coil 56 of the high frequency induction welding unit 55. It is to be understood that the method as disclosed herein is not limited to high frequency induction welding but that other types of welding may be used such as thermo-welding or ultrasonic welding.

As set out herein, the cross-sectional area of the positioning cavity 6 of the attachment unit 1 is adapted to the shape and size of the container body into which a container sealing element is to be introduced. The positioning cavity 6 of the attachment unit 1 which is shown in FIG. 8 is configured for attaching a container sealing element 29 in a container having a modified rectangular cross-sectional shape and comprises side portions being connected by corner portions corresponding to the generally rectangular cross-sectional shape of the bottom surface 11 of the base plate 8.

Regardless of the shape of the cross-sectional area of the positioning cavity 6 of the attachment unit 1, the cross-sectional area of the positioning cavity 6 of the attachment unit 1 is always larger than the cross-sectional area of the second expansion tool 10 allowing the unexpanded press plunger 2 to be inserted into the positioning cavity 6 without damaging a container body which has been placed in the positioning cavity 6.

The attachment unit shown in FIGS. 8 and 9 may be used in a method for sealing a packaging container, the method comprising:
  placing a container body 3 in the positioning cavity 6 of the retaining device 4 with a body wall of the container body 3 in alignment with a wall of the positioning cavity 6;
  applying a container sealing element 29 to the bottom surface 11 of the base plate 8, the container sealing element 29 comprising an attachment border 28 extending radially outward of the circumferential edge 12 of the bottom surface 11;
  moving the container sealing element 29 in the axial direction A of the attachment unit to an attachment position within the container body 3 by means of the expansible press plunger 2 and simultaneously flexing the attachment border 28 of the container sealing element 29 into alignment with the body wall of the container body 3;
  gradually transforming the expansible press plunger 2 from the unexpanded state to the radially expanded state by moving the first expansion tool 9 in the axial direction A towards the upper surface 14 of the bottom plate 8 and causing the inclined plane surface of the first expansion tool to contact and slide against the corresponding inclined plane surface 16 of the second expansion tool, whereby the side wall 22 of the second expansion tool is subjected to a biasing force causing the side wall 22 of the second expansion tool 10 to move in a direction away from the plunger axis $a_1$ of the expansible press plunger 2 and to press the attachment border 28 of the container sealing element 29 in the radial direction R towards the body wall of the container body 3;
  attaching the attachment border 28 of the container sealing element 29 to the body wall of the container body 3 by pressing the attachment border 28 of the container sealing element 29 against the body wall of the container body 3 by means of the sealing ridge 41 extending circumferentially on the outer surface 24 of the expansion tool side wall 22 of the second expansion tool 10 and welding the attachment border 28 of the container sealing element 29 to the body wall of the container body 3 along the sealing ridge 41;
  deforming the body wall of the container body 3 by radially pressing the deformation tool 42 into the indentation 57 in the wall of the positioning cavity 6 with the body wall of the container body 3 and the attachment border 28 of the container sealing element 29 located between the deformation tool 42 on the second expansion tool 10 and the indentation 57 in the wall of the positioning cavity 6.

Figure 10:
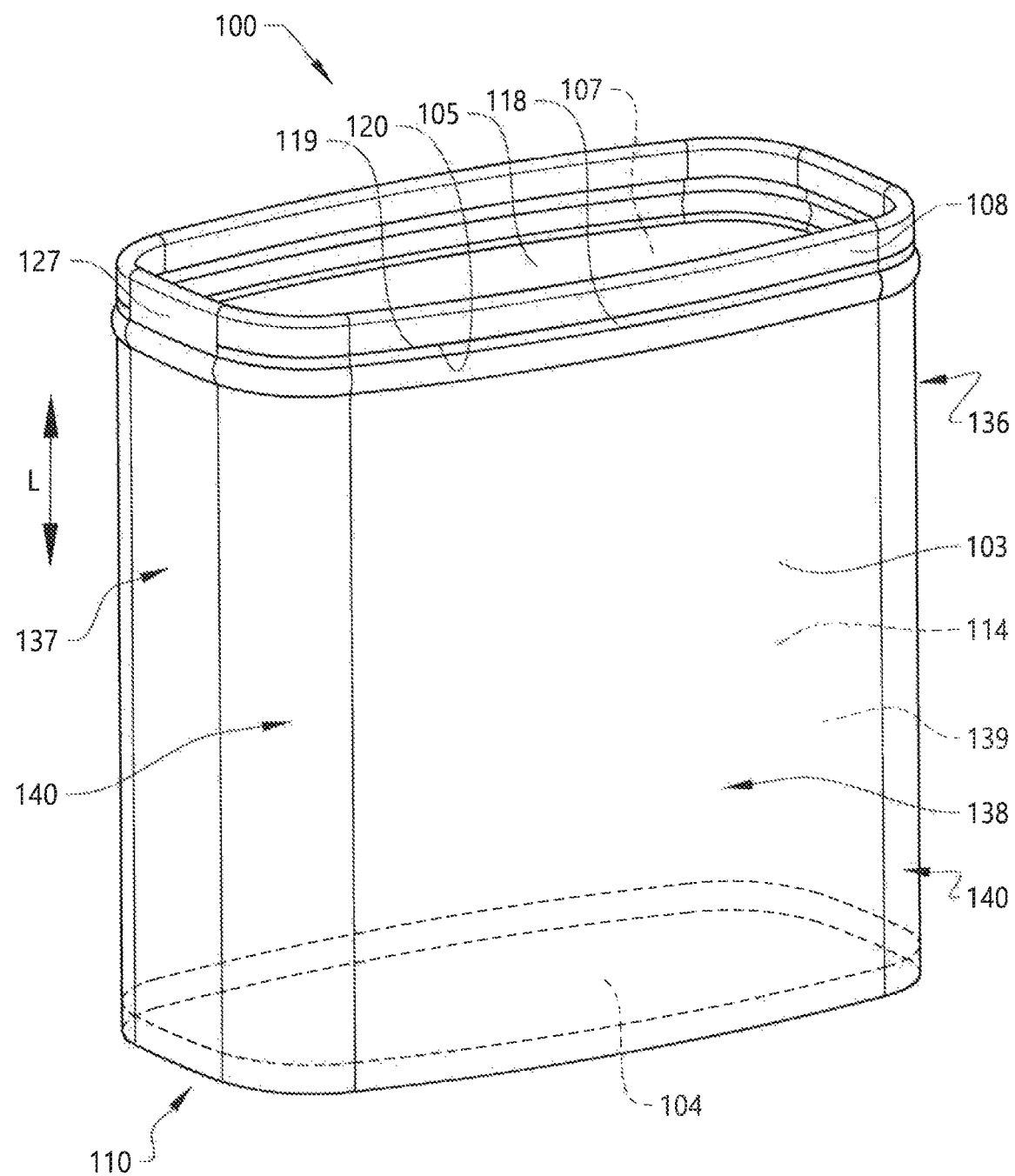
FIG. 10 shows a packaging container which can be made using the attachment unit shown in FIG. 1, the packaging container being shown in a closed state.
Figure 11:
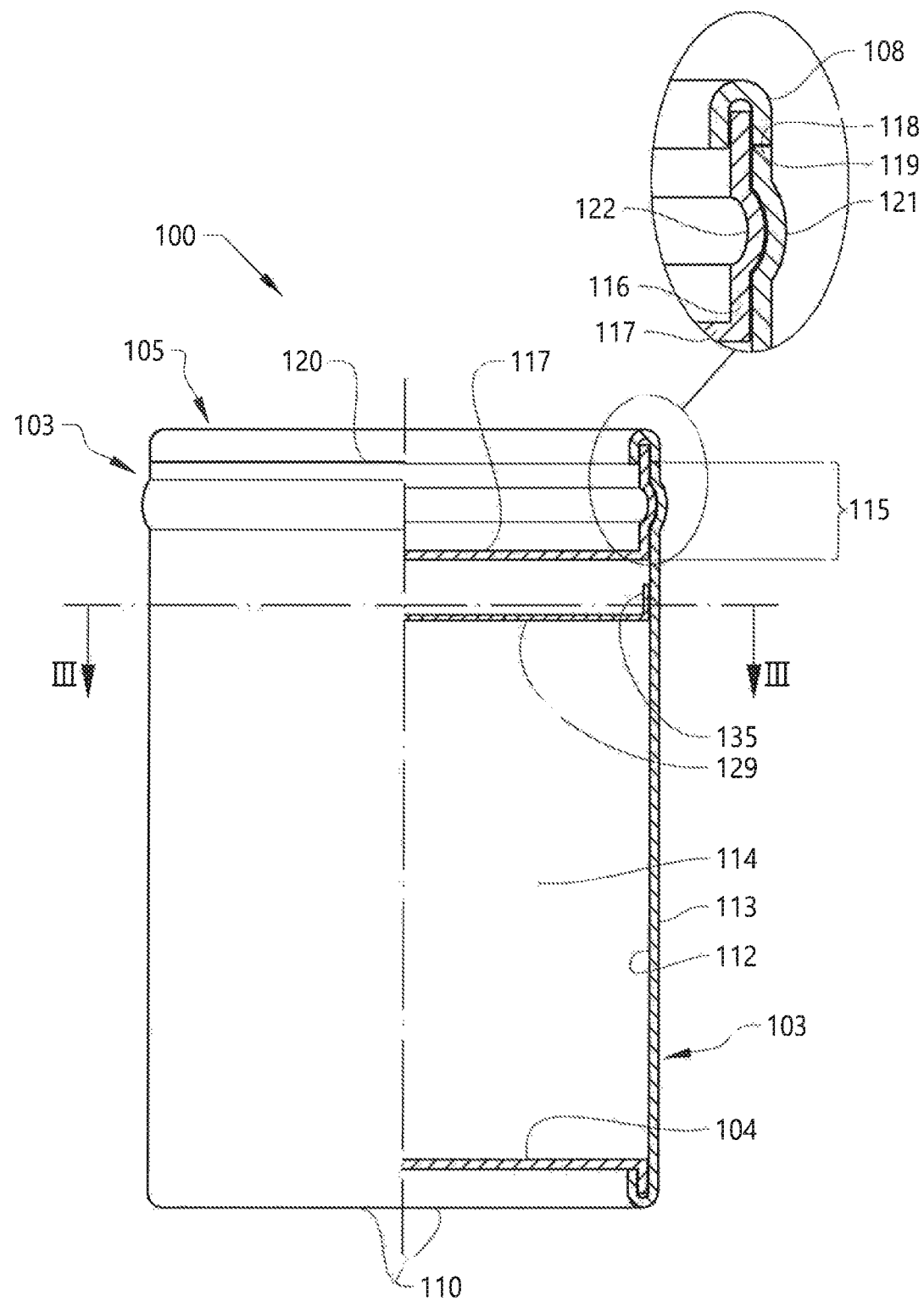
FIG. 11 shows the packaging container in FIG. 9 in a closed state with a part of FIG. 10 being a cross-sectional view.

The attachment unit 1 with the press plunger 2 as disclosed herein may be used when forming a paperboard packaging container 100 as shown in FIGS. 10 and 11 and described herein.

FIGS. 10 and 11 illustrate the paperboard packaging container 100 in a closed position. In FIG. 11 a part of the container wall has been broken away to show a cross-section of the closure arrangement of the packaging container 100.

The paperboard packaging container 100 comprises a tubular paperboard container body 103, a container bottom 104 and a container lid 105. The container body 103 extends in a longitudinal direction L of the container 100 from a bottom end 110 of the container body 103 to a container opening 107. The container body 103 comprises a container body abutment edge 118 at the container opening 107. The container body 103 has an inner surface 112 facing towards an inner compartment 114 in the packaging container 100 and an outer surface 113 facing away from the inner compartment 114.

The container body 103 has a modified rectangular shape. The paperboard container has a narrow front wall portion 136, a narrow rear wall portion 137, broad side wall portions 138,139 and curved corner portions 140 connecting the wall portions 136-137. The curved corner portions 140 may have a radius of curvature of between 15 and 30 mm. As set out herein, the shape of the container body as shown in FIGS. 10 and 11 constitutes only a non-limiting example and it is to be understood that the container body may have any useful shape, as set out herein.

The front and rear wall portions 136, 137 may be planar or may have an outwardly curved shape with a radius of curvature of from 30-1000 mm. Likewise, the side wall portions 138, 139 may be substantially planar or may have a curvature, as desired. The radius of curvature of the front, rear and side wall portions 136, 137, 138, 139 is always larger than the radius of curvature of the corner portions 140.

The container lid 105 comprises an outer circumferential lid collar 108 having a lid abutment edge 119, which is adapted for abutting against the container body abutment edge 118, and a lid plug-in portion 115. The container lid 105 is also provided with a grip tab 128.

The plug-in portion 115 has a side surface 116 which extends in the longitudinal direction L and faces the inner surface 112 of the container body 103 when the container lid 105 is in a closed position. The plug-in portion 115 further comprises a main surface 117 being located in the container body 103 at a distance from the container body abutment edge 118 when the container lid 105 is in a closed portion such that the plug-in portion 115 forms a plug extending downwards towards the container bottom 104.

The paperboard packaging container 100 is furthermore provided with a locking arrangement for improving retention of the container lid 105 in a closed position after closure of the lid 105. The locking arrangement which is shown in FIG. 11 comprises a first locking element 121 in the form of a recess, provided on the inner surface 112 of the container body 103, and a second locking element 122 in the form of a mating protrusion, provided on the side surface 116 of the lid plug-in portion 115. However, the first locking element 121 may alternatively be in the form of a protrusion and the second locking element 122 may be in the form of a recess, wherein the protrusion and the recess are matching such that the protrusion projects into the recess when the container lid 105 is in a closed position.

The first and second locking elements 121, 122 are arranged such that when the container lid 105 is in the closed position, the protrusion is in engagement with the recess, i.e. the first locking element 121, provided on inner surface 112 of the container body 103, is located at the same distance from the container body abutment edge 118 as the second locking element 122, provided on the side surface 116 of the plug-in portion 115.

The mating locking elements 121, 122 illustrated in FIGS. 10 and 11 are in the form of an elongated continuous protrusion and an elongated continuous recess provided along substantially 100% of the periphery of the inner surface 112 of the container body 103 and the side surface 116 of the plug-in portion 115, respectively. Alternatively, the locking elements may be provided only in one or more selected portions of the periphery of the inner surface 112 of the container body 103 and the side surface 116 of the plug-in portion 115, such as on the front wall 136 of the container body 103.

The packaging container 100 may be provided with two or more of the locking arrangements, such that two or more of the first locking element 121 and two or more of the second locking element 122, being arranged in parallel, spaced apart in the longitudinal direction L of the packaging container 100, continuously or discontinuously, along the periphery of the inner surface 112 of the container body 103 and along the periphery of the side surface 116 of the plug-in portion 115, respectively.

The container body abutment edge 118 and the lid abutment edge 119 in the packaging container 100 shown in FIGS. 10 and 11 are perpendicular to the wall of the container body 103 and have flat surfaces.

The container lid 105 is opened by pivoting the container lid about a hinge 127 provided between the container lid 105 and the container body 103. The hinge 127 is provided at the rear wall portion 137. In the example shown in FIGS. 10 and 11, the rear wall portion 137 forms a short side of the packaging container 100. Alternatively, a hinge may be provided at a rear wall portion formed from a long side of a packaging container having a rectangular shape as shown in FIGS. 10 and 11. For packaging containers having other shapes, such as circular, oval or other polygonal cross-sectional shapes, the hinge may be arranged at any suitable location on the circumference of the container opening. A further alternative is that the lid is a fully separable lid which can be completely removed from the container body.

As shown in FIG. 11, the lid collar 108 is delimited from the container body by a separation line 120 formed e.g., by one or more cuts or perforations, the separation line 120 extending along at least 55%, of the container body periphery. Thereby, lid collar 108 can be fully or partially separated from the container body at the abutment edges 118,119. A non-separated part of the lid collar may serve as a hinge 127 between the lid and the container body.

In a packaging container 100 as disclosed herein, the lid 105 may be arranged to be completely removed when opening the container 100. When the container lid 105 is a completely removable lid, the container lid 105 is free from permanent connections to the container body 103. For the lid collar 108 and, thus, the container lid 105 to be fully separable from the container body, the separation line 120 should extend completely around the container body 103 periphery. However, before a first opening of the packaging container 100 the lid collar 108 may be connected to the container body by small lugs remaining between cuts or perforations forming the separation line 120.

The paperboard packaging container 100 shown in FIGS. 10 and 11 is provided with a fully or partly removable transport closure 129 being attached to the inner surface 112 of the container body 103 at a transport closure peripheral flange 135. The transport closure 129 is removed by a user in order to gain initial access to the packaged content. The transport closure 129 may be fully removed by peeling away the peripheral flange 135 from the inner surface 112 of the container body 103. Alternatively, the transport closure 129 may be partly removed, leaving at least the peripheral flange 135 still attached to the inner surface 112 of the container body 103. The remaining peripheral flange 135 and any other part of the transport closure 129, which is not removed, may act as a reinforcement of the container opening 107 and may stabilize the shape of the container opening 107. The stabilizing residual parts of the transport closure 129 contribute to maintaining a distinct and well-fitting closure even after the container 100 has been opened and closed multiple times. The transport closure 129 is provided at a sufficient distance from a container body abutment edge 118 at said container opening 107 to allow the container lid 105 comprising the plug-in portion 115 to be in a closed position, meaning that this distance should be equal to or larger than the height of the plug-in portion 115.

As may be seen in FIG. 11 the container bottom 104 is in the form of a bottom disc provided in the bottom end 110, the bottom disc having a peripheral flange being flexed towards the bottom end 110 in the longitudinal direction L. The attachment of the flange may be performed by gluing or welding, for instance with high frequency induction welding to the inner surface 112 of the container body 103. The bottom end edge is folded inwards over the bottom disc flange.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An expansible press plunger comprising:
   a plunger having a plunger body aligned with a plunger axis extending in an axial direction perpendicular to a radial direction;
   an expansion tool side wall having an inner surface and an outer surface, the expansion tool side wall defining a cavity within which the plunger body translates along the plunger axis, wherein the outer surface includes a sealing extension protruding from the outer surface and a deformation extension protruding from the outer surface, the side wall being transformable between an unexpanded state and a radially expanded state, wherein the side wall comprises a first inclined plane surface being inclined away from the plunger axis and wherein the plunger body comprises a second inclined plane surface the second inclined plane surface of the plunger body contacting and applying pressure to the corresponding first inclined plane surface of the side wall when the side wall is in the radially expanded state, wherein the side wall is transformable between the unexpanded state and the radially expanded state by movement of the plunger body along the plunger axis downward inside of the side wall wherein the side wall is made of a material which can be repeatedly flexed and/or stretched.

2. The expansible press plunger in accordance with claim 1, wherein the first inclined plane surface is inclined at a first angle and wherein the second inclined plane surface is inclined at a second angle, wherein a difference between the first angle and the second angle is from 1° to 3°.

3. The expansible press plunger in accordance with claim 1 wherein a first distal end of the deformation extension is a greater distance from the plunger axis than a second distal end of the sealing extension.

4. The expansible press plunger in accordance with claim 3, wherein the first distal end of the deformation extension moves a first radial distance when the side wall transitions between the unexpanded state and the radially expanded state, and wherein the second distal end of the sealing extension moves a second radial distance when the side wall transitions between the unexpanded state and the radially expanded state, wherein the first radial distance is greater than the second radial distance.

5. The expansible press plunger in accordance with claim 4, wherein the deformation extension is proximate a bottom of the side wall and wherein the sealing extension is positioned above the deformation extension.

6. The expansible press plunger in accordance with claim 1, further comprising outer tooling within which the plunger and the expansion tool side wall are disposed, the outer tooling having a receiving region that receives at least a portion of the deformation extension when the side wall is in the expanded state.

7. The expansible press plunger in accordance with claim 1, wherein an expansion slit is arranged in the side wall, the expansion slit extending in the side wall in the axial direction.

8. The expansible press plunger in accordance with claim 7, wherein the side wall has a height in the axial direction, the expansion slit extending in the side wall a distance in a range of from 40% to 100% of the height of the side wall, such as from 40% to 70% or from 45% to 60%.

9. The expansible press plunger in accordance with claim 7 wherein a plurality of expansion slits extend from a bottom of the side wall towards a top end of the side wall and divide the side wall into a plurality of segments.

10. The expansible press plunger in accordance with claim 9, wherein each of the expansion slits of the plurality of expansion slits is terminated at respective end openings, each respective end openings arranged on a hinge line extending in a circumferential direction of the side wall, perpendicular to the axial direction.

11. The expansible press plunger in accordance with claim 1, wherein the comprises a sealing extension extends circumferentially on the outer surface of the side wall along all or part of a circumference of the side wall.

12. The expansible press plunger in accordance with claim 1, wherein the deformation extension protrudes in the radial direction from the outer surface of the side wall.

13. The expansible press plunger in accordance with claim 12, wherein the deformation extension extends circumferentially on the outer surface of the side wall along all or part of a circumference of the side wall.

14. The expansible press plunger according to claim 12, wherein the sealing extension is arranged above the deformation extension as in the axial direction.

15. The expansible press plunger according to claim 1, wherein the side wall is formed as one integral piece.

16. An attachment unit for attaching a container sealing element to a container body, the attachment unit comprising an expansible press plunger according claim 1 and a retaining device, the retaining device being adapted to retain the container body, the retaining device comprising at least one through-going positioning cavity being adapted to receive and hold a portion of the container body, the positioning cavity of the retaining device having a cross-sectional area defining a footprint area of the container body, the expansible press plunger being axially movable between an attachment position inside the positioning cavity of the retaining device and a rest position outside the positioning cavity of the retaining device.

17. An attachment unit according to claim 16, wherein the retaining device comprises a welding unit comprising an induction coil arranged around the positioning cavity.

18. An attachment unit according to claim 16, wherein the positioning cavity of the retaining device comprises an indentation arranged in a wall of the positioning cavity.

19. A plunger device comprising:
an expansion plunger having a body defining a peripheral surface, the expansion plunger arranged to translate along a vertical axis;
an expansion shell disposed around the peripheral surface and aligned with the vertical axis, the expansion shell including:
a wall defined between an inner surface and an outer surface, the inner surface defining a cavity within which the expansion plunger translates;
wherein the outer surface of the expansion shell includes a sealing extension protruding from the outer surface and a deformation extension protruding from the outer surface; and
wherein translation of the expansion plunger moves each of the sealing extension and the deformation extension outward from the vertical axis.

20. An attachment unit for attaching a container sealing element to a container body, the attachment unit comprising a plunger device according claim 19 and a retaining device, the retaining device being adapted to retain the container body, the retaining device comprising at least one through-going positioning cavity being adapted to receive and hold a portion of the container body, the positioning cavity of the retaining device having a cross-sectional area defining a footprint area of the container body, the plunger device being axially movable between an attachment position inside the positioning cavity of the retaining device and a rest position outside the positioning cavity of the retaining device.

21. The attachment unit according to claim 20, wherein the retaining device comprises a welding unit comprising an induction coil arranged around the positioning cavity.

* * * * *